United States Patent [19]
Russell

[11] 3,849,605
[45] Nov. 19, 1974

[54] SOLID STATE CONTINUITY CHECK CIRCUIT

[75] Inventor: Stanley L. Russell, West Webster, N.Y.

[73] Assignee: Stromberg-Carlson Corporation, Rochester, N.Y.

[22] Filed: Dec. 29, 1972

[21] Appl. No.: 319,245

[52] U.S. Cl........ 179/16 AA, 179/18 AB, 179/84 A
[51] Int. Cl............................................... H04m 3/02
[58] Field of Search...... 179/18 AB, 84 A, 175.2 C, 179/18 FA

[56] References Cited

UNITED STATES PATENTS

| | | | |
|---|---|---|---|
| 2,263,139 | 11/1941 | Parker et al. | 179/84 A |
| 3,729,597 | 4/1973 | Garrett et al. | 179/175.3 |
| 3,750,114 | 7/1973 | Valassis | 179/18 AB |

FOREIGN PATENTS OR APPLICATIONS

| | | | |
|---|---|---|---|
| 1,312,468 | 10/1961 | France | 179/18 F |

OTHER PUBLICATIONS

TTL Integrated Circuits Catalog by Texas Instruments, Inc., (Aug 1, 1969), page 3–34.

Allied Industrial Electronics Catalog, 1969, by Allied Radio Corporation, pages 118 & 254.

*Primary Examiner*—Kathleen H. Claffy
*Assistant Examiner*—C. T. Bartz
*Attorney, Agent, or Firm*—William F. Porter, Jr.

[57] ABSTRACT

An optoelectronic coupler, responsive to a check request signal, is connected via a rectifier bridge circuit to the tip and ring lines of a telephone circuit to provide a continuity signal in response to a potential being present across the tip and ring leads. Timing means are provided for transmitting the continuity signal to the system control during a preset time interval in a timing sequence.

8 Claims, 2 Drawing Figures

SOLID STATE CONTINUITY CHECK CIRCUIT

BACKGROUND OF THE INVENTION

The invention pertains to telephone circuits in general, and more particularly to a continuity check circuit for telephone systems for determining whether the tip and ring path is complete prior to releasing the control circuit used in setting up the connection.

In the present day common control telephone offices, multistage matrix switching networks are used to provide connections between the various telephone circuits. A telephone connection generally includes a large number of crosspoints connected in series. The crosspoints can be electromechanical relay contacts or solid state semiconductor devices. With a large number of crosspoints included in each connection, it is quite feasible that after setting up a call through the network one or more of the many crosspoints in series with the selected tip and ring path may be defective or open. If a determination is not made as to whether or not a communication path is in fact available through the selected tip and ring path, the common control equipment would release after establishing a faulty connection and the call would be lost.

Continuity checks are generally made once a path has been established and prior to the release of the common control equipment. The continuity check generally involves a direct current potential being applied to the tip and ring leads at one end of the connection and a continuity checking circuit across the other end of the connection to determine that a direct current path is available between the interconnected circuits. If a potential is detected by the continuity check circuit which indicates that a connection is completed, the common control is released. On the other hand if no potential is detected, the common control system performs another path finding sequence to establish the connection.

Many telephone systems include a matrix switching network wherein the crosspoint devices include a mark coil that is used in selecting a path and for initially actuating the selected crosspoints, and a sleeve coil for maintaining the crosspoints operated after the mark coil is de-energized. A system of this type is disclosed in a copending patent application entitled, "Path Finding System", now U.S. Pat. No. 3,729,593 issued to Otto Altenburger and Robert H. Bansemir and assigned to the same assignee as the present invention. In the system of the copending patent application a path could be established through the use of the mark and sleeve coils and the crosspoints operated with a faulty crosspoint in the tip or ring lead, and therefore without a continuity check of the tip and ring path a faulty connection would be established and a common control released and the call lost. Consequently, a continuity check is required to be made on the tip and ring path to guarantee that the audio portion of the interconnection has been in fact established.

In addition to the foregoing, the crosspoints used in establishing the connection through the matrices generally are of the type that cannot tolerate any large amount of current flow at the time of operation. For example, glass reed switches commonly used in telephone switching matrices are designed to handle only a small amount of current and any actuation thereof (i.e., opening or closing) with normal current flow therethrough, causes arcing which in turn may destroy the contacts. Consequently, at the time of the setup of the telephone connection through the switching matrices, the normal low impedance battery feed circuits, which provide a range of current flow between 20 to 100 milliamps, cannot be connected. If by accident a glass reed crosspoint is operated during a completed circuit, the glass reed contacts in the tip or ring lead can be destroyed and any subsequent use of that crosspoint will result in a faulty connection. Hence, it is very essential that in matrices employing the glass reed switches all switching must be done under very low or no current flow. Any continuity check should be made with circuits that only draw a very small amount of current, if any at all.

The continuity check circuits of the prior art generally include a relay that is switched across the tip and ring path and operated if the loop is complete. The relay in the continuity check circuits of the prior art provides electrical isolation so that in the event of high transient signals caused by lightning, or the switching of inductive devices, the transient signals would not be transmitted to the control equipment. Such an arrangement is generally satisfactory, but introduces some problems. For example, a relay of the type generally used for the continuity check requires current flow in the order of 30–35 milliamps for proper operation. Therefore, the system must first determine that the entire switching train has been actuated prior to the connection of the continuity check circuit. In addition to the foregoing, the relay is a rather slow operating device requiring typically in the order of 1½ to 3 milliseconds to operate. Furthermore, the relay coil is an inductive type device tending to induce arcing should a crosspoint in the circuit connected thereto open. These characteristics of the relay are such that the relay imposes restrictions on the the telephone system to insure that the low impedance battery feed circuits are not applied to the tip and ring pair until the common control has indicated that the relay in the continuity check circuit has operated and sufficient time has been allowed for the signals to be processed and the relay subsequently released. This arrangement complicates the system control circuits as well as reducing the speed at which paths through the switching networks can be established.

It is therefore an object of this invention to provide a new and improved continuity check circuit for telephone systems.

It is also an object of this invention to provide a new and improved continuity check circuit for telephone systems that does not include any inductive components, has a rapid response, and draws a very low amount of current.

It is also an object of this invention to provide a new and improved continuity check circuit for telephone systems that comprises semiconductor devices and therefore is readily adapted for mounting on printed circuit boards by automatic manufacturing techniques.

It is also an object of this invention to provide a new and improved continuity check circuit for telephone systems that includes semiconductor devices that provide electrical isolation between the check circuit and the control circuitry connected thereto.

It is also an object of this invention to provide a new and improved continuity check circuit for telephone systems that draws sufficiently low current that allows the telephone system to switch the continuity circuit into and out of the telephone loop without the necessity of assuring that the crosspoints are not operated during the connection of the continuity to the loop.

BRIEF DESCRIPTION OF THE INVENTION

A continuity check circuit for connection to the tip and ring leads of a telephone circuit including a semiconductor device having an input circuit with a radiation source that generates photon radiation, the intensity of which is a function of current flow therethrough, and an output circuit with a radiation sensitive device, the impedance of which is a function of the intensity of radiation received from the source, said input and output circuits being electrically isolated. The continuity check circuit also includes switching circuit means, responsive to a control signal, for connecting the semiconductor device to the tip and ring leads, so that in response to a potential being present across the tip and ring leads, said input circuit is rendered conductive and said semiconductor device produces a continuity check signal from the output circuit. This arrangement provides a rapid responding solid state continuity check circuit that provides for electrical isolation between the tip and ring lines being monitored and the control circuitry receiving the continuity check signals.

According to a feature of the invention a rectifier bridge circuit is connected between the tip and ring lines and the input circuit of the semiconductor device so that the continuity check can be made with normal or reverse potential present across the tip and ring lines.

The further feature of the invention includes a timing circuit connected to the output circuit of the semiconductor device for transmitting the continuity check signal during a preset time interval in a timing sequence thereby minimizing the effects of transient signals.

Whenever two or more tip and ring telephone connections are to be simultaneously monitored, a separate continuity check circuit is provided for each pair of tip and ring leads and circuit means responsive to the simultaneous presence of the continuity check signals from all the continuity check circuits provides a signal that all the connections are properly completed.

DETAILED DESCRIPTION OF THE INVENTION

Figure 1:
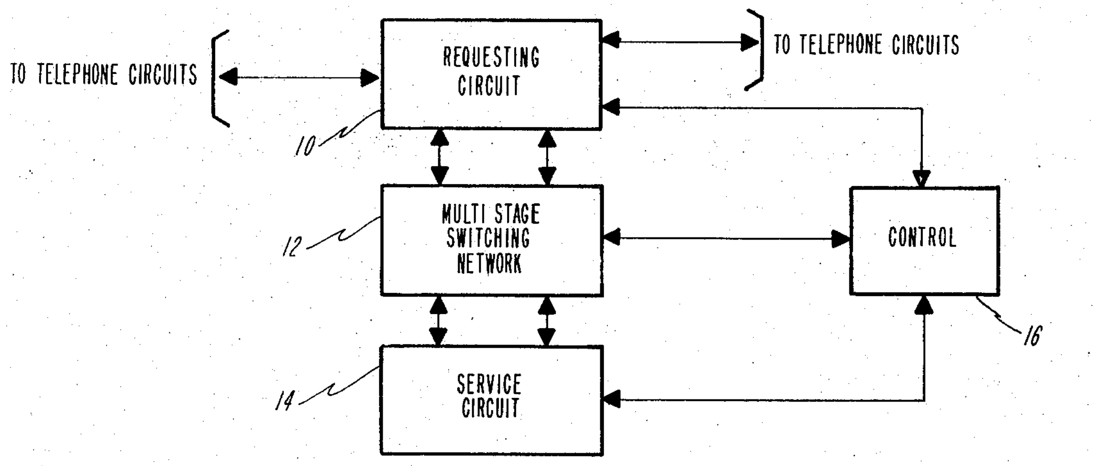
FIG. 1 is a block diagram of a portion of a telephone system for interconnecting telephone circuits through a multistage matrix switching network.

The block diagram of FIG. 1 is a typical configuration of a common control telephone system for interconnecting two telephone circuits via a multistage matrix switching network 12. A requesting circuit 10 such as, for example, a telephone line circuit or a trunk circuit, is connected via at least one tip and ring pair through the multistage switching network 12 to a service circuit 14, such as, for example, a register, or an operator position circuit. Alternately the requesting circuit 10 can be a trunk circuit for interconnecting two telephone sets through the switching network 12, in which event the service circuit 14 represents the telephone sets. In the event that the requesting circuit 10 is a trunk circuit and the service circuit is an operator's position circuit, the trunk circuit may be connected through the multistage network by two pairs of tip and ring leads. The control circuit 16 for the telephone system is connected to the requesting circuit 10, the service circuit 14 and the multistage switching network 12 to provide the necessary control function for establishing the connections therebetween. A telephone system for connecting trunk circuits to operator position circuits is disclosed in a copending patent application, now U.S. Pat. 3,816,665, entitled, "Operator Loop complex", Ser. No. 293,752, and a copending patent application, now U.S. Pat. No. 3,769,462 entitled, "Private Automatic Branch Exchange Service Circuit Complex", Ser. No. 293,750, both of which were filed on Sept. 29, 1972, for Stanley L. Russell, Klaus Gueldenpfennig and Uwe A. Pommerening and are assigned to the same assignee as the present invention. The control circuit 16, in response to request for a connection from the requesting circuit 10, enables a path finding system to establish a connection between the requesting circuit 10 and the service circuit 14 via the switching network. Once the path or paths have been established, a continuity check is made through the tip and ring pairs to determine that a valid interconnection has been established before the control circuit 16 releases. In such an arrangement either the requesting circuit or the service circuit will apply a battery potential across the tip and ring pair and the other circuit will connect a continuity check circuit thereto. If the continuity check indicates a completed connection the control circuit 16 is released. On the other hand, if the continuity check detects a fault, the control circuit 16 is signalled to initiate another path finding sequence to determine a different path through the network.

Figure 2:
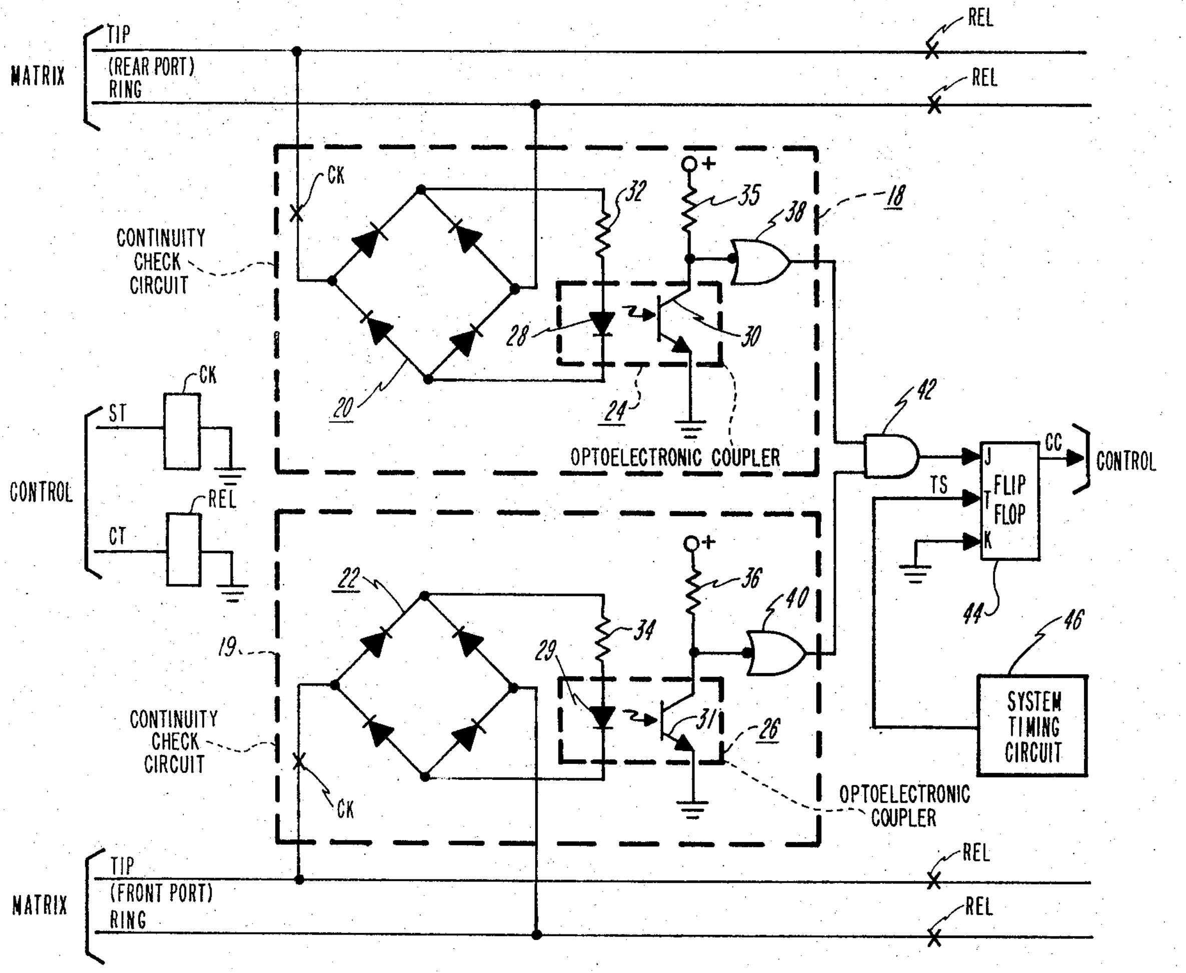
FIG. 2 is a schematic diagram of an optoelectronic coupler continuity check circuit of the invention for use in the telephone systems of the type illustrated in FIG. 1.

The continuity check circuit of FIG. 2 can be included in either the requesting or the service circuit, provided the other circuit has means for applying battery potential across the tip and ring pairs. When a connection has been established through the network, the common control 16 applies a signal ST to operate a check relay CK. The operation of the relay CK connects the continuity check circuits to the tip and ring pairs. A separate continuity check circuit (18 and 19 for the rear and front ports, respectively) is provided for each tip and ring pair being monitored for each connection. In the arrangement illustrated in FIG. 2, two tip and ring pairs are being monitored simultaneously. Such would be the case of a trunk circuit connection to an operator position circuit in the system of the copending patent applications entitled, "Operator Loop Complex" and "Private Automatic Branch Exchange Service Circuit Complex". If only one tip and ring pair is to be monitored only one continuity circuit will be required.

Each of the continuity check circuits 18 and 19 of FIG. 2 includes a separate diode bridge circuit 20 and 22, respectively. A pair of opposite junctions of separate ones of the bridge circuits 20 and 22 are connected to the rear port and the front port tip and ring leads, respectively, via contacts of the relay CK. The diode bridge circuits 20 and 22 are used so that continuity checks can be performed with either normal or reverse battery being applied to the tip and ring leads at the time of checking. The junctions of bridge circuits 20 and 22 opposite those connected to the tip and ring lines are connected to separate optoelectronic couplers 24 and 26, respectively. Each optoelectronic coupler 24 and 26 includes a photon radiation source 28 and 29, respectively, such as a light emitting diode. Photon radiation from the diodes 28 and 29 is transmitted to the photosensitive transistor 30 and 31, respectively. The diodes and the transistors in each optoelectronic coupler 24 and 26 are electrically isolated and are included in hermetically sealed packages. The operation of the optoelectronic coupler is described in detail in an article entitled, "Look At What Optical Semiconductors Do Now" by Michael F. Wolff, pages 32–34 in the June 28, 1963 issue of "Electronics". The light emitting diode 28 is connected to the bridge circuit 20 via a resistor 32. The light emitting diode 29 is connected to the bridge circuit 22 via a resistor 34. The collectors of the photosensitive transistors 30 and 31 are connected to a positive power supply via the resistors 35 and 36, respectively, while the emitters are connected to the ground. The output signal from the optoelectronic couplers 24 and 26 are applied through the inverter circuits 38 and 40, respectively, to separate inputs of an AND gate 42. The resistors 32 and 34 are selected so that if a complete loop has been detected, the current flow through the light emitting diodes 28 and 29 is sufficient to saturate the corresponding photosensitive transistor. Hence, if a tip and ring connection is tested to be valid, a corresponding signal is produced by the inverter circuits 38 and 40.

If a valid continuity check is simultaneously made on both the tip and ring pairs (front and rear ports) the AND gate 42 is enabled to apply an enable signal to a flip-flop circuit 44. The flip-flop is "set" at some prescribed time later by a timing signal on the lead TS by the system timing circuit 46, at which time the flip-flop applies a check signal on lead CC indicating to the control system a valid continuity check has been made on both the front and rear ports. At some time later, the common control in turn releases the checking relay CK to disconnect the continuity check circuit and simultaneously therewith applies a signal CT to operate the relay REL to complete the connection through the tip and ring pairs (front and rear ports) between the telephone circuits to be interconnected.

The continuity check circuit of the invention can be used with a system timing circuit such as that disclosed in the copending patent application entitled, "Private Automatic Branch Exchange Service Circuit Complex", wherein the first time slot in a series of ten time slots that are allotted to each service circuit in sequence can be used to operate the relay CK. Any subsequent time interval thereafter that provides sufficient time for path finding and crosspoint operation, such as the sixth time slot, can be used to set the flip-flop 44. The last time slot of the ten time slots can be used to reset the flip-flop 44, release the check circuit CK and operate the release relay REL. This arrangement allows for sufficient time for the common control circuit to make necessary systems checks between the start of the continuity check and the completion of the connection, and also eliminates the possibility of responding to transient signals.

The amount of current drawn by the continuity check circuit of the invention is determined by the value of resistors 32 and 34, which values can be selected to provide a current level well within the tolerable switching limits of the matrix crosspoints. Thus, no special circuitry is required in the control circuits to prevent the low impedance battery feed circuit from being applied to the tip and ring pairs at the time of the connection of the checking circuit. In addition, the speed of operation of the optoelectronic couplers is typically in the range of 2–12 microseconds thereby allowing a continuity check to be performed in substantially less time than would be required under the present day relay continuity check circuits thereby reducing the time required in setting up a connection through the matrix. The timing signal arrangement for setting the flip-flop 44 is such as to eliminate the possibility that the continuity check circuits will respond to transient signals. In addition to the foregoing, the optoelectronic couplers have a breakdown voltage in the order of 1,500–2,500 volts that corresponds to the isolation available between the usual relay and its closest contact. Hence, sufficient isolation is available between the tip and ring line and the common control circuits to prevent the transmission of high voltage transients to the control circuitry. In addition to the foregoing, since the continuity check circuit is essentially a completely solid state circuit, the number of inductive components in the tip and ring lines is reduced thereby reducing arcing of the contacts in the event that the crosspoints in connection should be erroneously operated during continuity check. The use of the solid state circuitry allows the continuity check circuits to be mounted on printed circuit boards with other low level logic circuits so that automatic manufacturing techniques can be applied. In addition, the use of the optoelectronic couplers provides a cost savings over the corresponding usual relays used in the continuity check circuits of the prior art.

What is claimed is:

1. A continuity check circuit for common control telephone systems for connection to the tip and ring leads of a telephone circuit for detecting the presence of a potential across the tip and ring leads, said continuity check circuit comprising:

a semiconductor device including an input circuit having a radiation source that generates photon radiation, the intensity of which is a function of the current flow therethrough, and an output circuit having a radiation sensitive device, the impedance of which is a function of the intensity of radiation from said source, said input and output circuits being electrically isolated, and circuit means for connecting, in response to the application thereto of a signal from the common control, said input circuit of said semiconductor device to the tip and ring leads of a telephone circuit so that in response to a potential being present across said tip and ring leads said input circuit is rendered conductive to produce a continuity check signal from said output circuit.

2. A continuity check circuit as defined in claim 1 wherein said circuit means includes:

a rectifier bridge circuit;

switching means for connecting opposite junctions of the bridge circuit across the tip and ring leads, and circuit means for connecting the other opposite junctions of the bridge circuit to said input circuit.

3. A continuity check circuit as defined in claim 2 including:

timing means connected to said output circuit for transmitting the signal from said output circuit for a preset time interval in a timing sequence.

4. A continuity check circuit as defined in claim 3 wherein said timing means includes:

switching circuit means including a flip-flop circuit with a first input circuit connected to said output circuit for enabling the flip-flop circuit to be switched to a first state by said continuity check signal in response to a timing signal applied to a second input circuit of said flip-flop circuit, and to be switched to a second state when said continuity check signal terminates and a second timing signal is applied to said second input circuit of said flip-flop circuit.

5. A continuity check circuit for common control telephone systems for connection to the tip and ring leads of a telephone circuit for detecting the presence of a potential across the tip and ring leads, said continuity check circuit comprising:

an optoelectronic coupler;

a rectifier bridge circuit;

a relay circuit means for connecting opposite junctions of said bridge circuit to the tip and ring leads of a telephone circuit;

circuit means for connecting, in response to the application thereto of a signal from the common control, said optoelectronic coupler to the other opposite junction of said bridge circuit so that said optoelectronic coupler produces a continuity check signal in response to the presence of a potential across the tip and ring leads, and timing means connected to said optoelectronic coupler for repeating the continuity check signal for a preset time interval in a timing sequence.

6. A continuity check circuit as defined in claim 5 wherein said timing means includes:

switching means including a flip-flop circuit with a first input circuit connected to said optoelectronic coupler for enabling the flip-flop circuit to be switched to a first state by said continuity check signal in response to a timing signal applied to a second input circuit of said flip-flop circuit, and to be switched to a second state when said continuity check signal terminates and a second timing signal is applied to said second input circuit of said flip-flop circuit.

7. A continuity check circuit arrangement for common control telephone systems for connection to a first and a second pair of tip and ring leads extending to at least one telephone circuit for detecting the simultaneous presence of potentials across both of said first pair of tip and ring leads and said second pair of tip and ring leads, said continuity check arrangement comprising:

first and second rectifier bridge circuits;

first and second optoelectronic couplers;

relay circuit means for connecting the opposite junctions within each of said first and second rectifier bridge circuits, respectively, to separate ones of the first and second pairs of said tip and ring leads in response to the application of a signal to said relay circuit means by said common control;

first circuit means connecting the other opposite junctions of the first and second rectifier bridge circuits to separate ones of said first and second optoelectronic couplers so that in response to potentials applied across the tip and ring pairs, corresponding optoelectronic couplers produce continuity check signals, and second circuit means responsive to the simultaneous presence of the continuity check signals from said first and second optoelectronic couplers to provide a signal indicating a valid connection.

8. The continuity check arrangement as defined in claim 7 including:

timing means connected to said second circuit means for repeating the valid connection signal at a preset time slot in a timing sequence.

* * * * *